Figure 6:
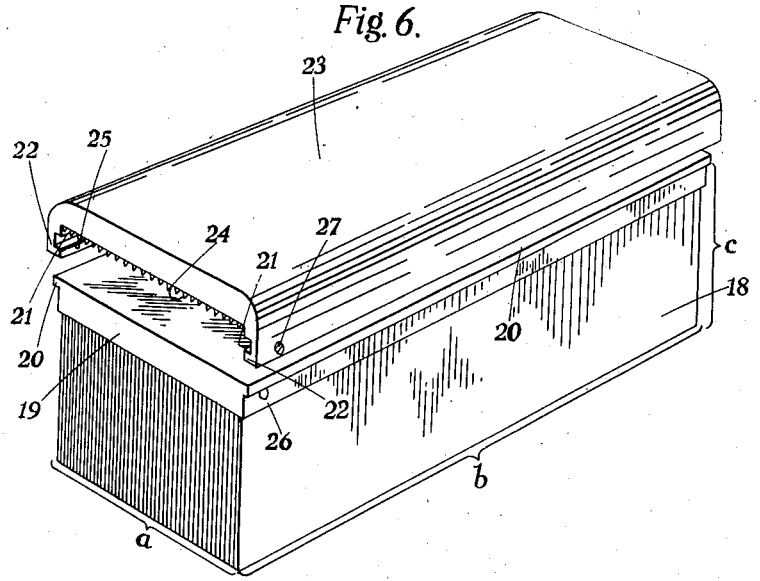

June 4, 1940. P. J. GILLESPIE 2,203,195
BLOTTING DEVICE
Filed Aug. 8, 1939 2 Sheets-Sheet 1
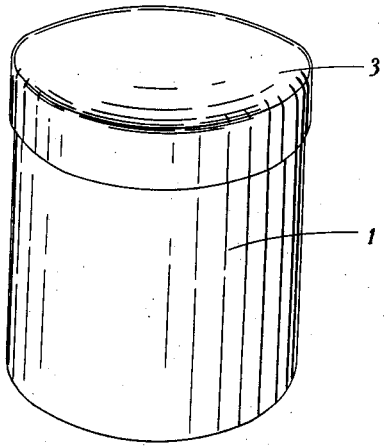
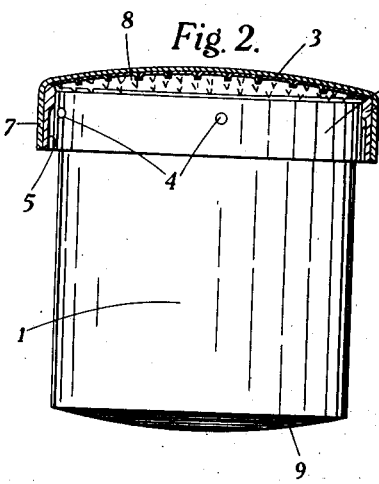
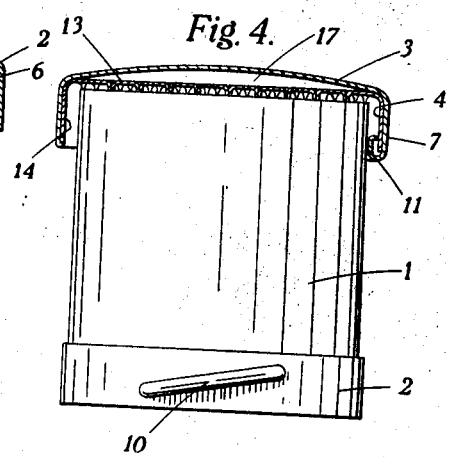
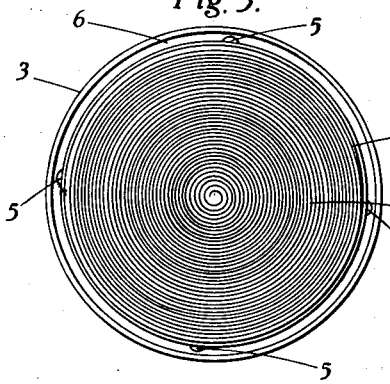
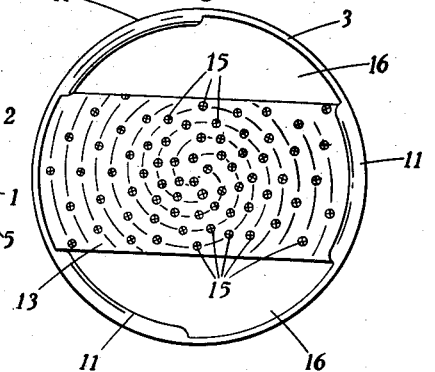
INVENTOR
Percy Joseph Gillespie,
BY John B. Brady
ATTORNEY June 4, 1940.  P. J. GILLESPIE  2,203,195
BLOTTING DEVICE
Filed Aug. 8, 1939   2 Sheets-Sheet 2

INVENTOR
Percy Joseph Gillespie,
BY
John B. Brady
ATTORNEY

Patented June 4, 1940

2,203,195

UNITED STATES PATENT OFFICE 2,203,195

BLOTTING DEVICE

Percy Joseph Gillespie, London, England

Application August 8, 1939, Serial No. 289,055
In Great Britain January 12, 1939

10 Claims. (Cl. 120—24)

This invention relates to blotting devices of the kind comprising a block of absorbent material, more particularly a block constituted by a plurality of layers of absorbent material, such as blotting paper, secured together so that the edges of the layers constitute the blotting or absorbent surface.

A blotting device of this kind is more convenient to use than a sheet of blotting paper in that it requires only one hand, and its absorbent surface is effective for a longer period than that of a rocker type of blotter. However, the absorbent surface tends to accumulate dust, which depreciates its absorption qualities and shortens its period of usefulness.

The present invention provides, for a blotting device of the aforesaid kind, a member having a recess adapted to receive the absorbent surface of the blotter, and abrading means, located in the recess serving under relative movement of the blotter and said member to clean the absorbent surface.

The invention further provides a blotting device comprising a block of absorbent material mounted in a holder, one of the surfaces of the block constituting the absorbent surface and an opposite surface being embraced by the holder, and a gripping member removably engaging the holder, said gripping member having a recess in which is located means for abrading the absorbent surface of the block under relative movement of the block and the gripping member, and the engagement of the holder and the gripping member serving to enclose the abraiding means.

In a blotting device as aforesaid, the block of absorbent material may be constituted by at least one strip of blotting paper or the like wound spirally into a cylinder, one of the circular ends of the block being the absorbent surface and the other end being mounted in the holder.

The holder and the gripping member may be mutually engageable by screw-threaded means or by bayonet joint means. For example, a screw thread, rolled, moulded or otherwise formed on the periphery of the holder may be adapted to engage with a co-operating screw thread formed in the peripheral wall of a circular recess in the gripping member which accommodates the abrading means. Alternatively, a plurality of radial projections on the holder may be engageable with part-helical or L-shaped grooves in said peripheral wall, or vice versa.

The block of absorbent material may alternatively be constituted by a plurality of rectangular sheets of blotting paper or the like compacted to a suitable thickness, the sheets being formed in or cut to suitable dimensions, one of the surfaces constituted by the edges of the several sheets serving as the absorbent surface and the opposite surface being embedded in a conveniently shaped holder. The holder and the gripping member may be mutually engageable by tongue and groove means, preferably with ball catch or equivalent means for automatically locating them in engagement.

The holder may be made in any convenient, cheap and easily produced form, since it may be completely covered when engaged in a gripping member of more ornamental, attractive or valuable material. The blotting block and its holder may thus be made as a cheap refill for a more expensive and/or perdurable gripping member. For example, the holder may be of thin aluminium, brass or other common metal, while the gripping member is of gold, silver or electroplate, or of semi-precious stone, such as jade or malachite, or of moulded synthetic resinous or cellulosic composition—evidently there is no limit to the variety of substances which may be employed. Alternatively, of course, the holder when engaging the gripping member may be partly exposed, in which case it may be made of the same material as said member or a contrasting material.

An abrading member according to the invention may alternatively be constituted as a base or stand having a recess in which the blotter is located when not in use, so that its absorbent surface remains free from dust for a longer period, the abrading means located in the recess serving rapidly to remove any accumulation of dust with some of the ink-saturated surface particles of fibres under relative movement of the blotter and the base or stand when pressed together. The blotter may then be provided with a gripping member, either permanently secured to the absorbent block or removably secured to a holder for the block, the gripping member and the base or stand preferably being of the same or similar material.

The abrading means may be constituted in divers ways. It may, for example, be of metal, as in the form of a thin metal sheet with roughly punched, small apertures, the ragged edges of which serve as abrading teeth, or in the form of a metal plate or strip with punched-up or rasp-like teeth or with file teeth. Again, it may consist of a multiplicity of pins or the like extending point uppermost from the bottom of the recess, or from a member seated in the recess.

The teeth or pins may be disposed in at least one spiral, so that while they serve to abrade the entire blotting surface they are sufficiently spaced apart to eliminate the possibility of the abraded particles accumulating between them and reducing their effectiveness.

The abrading means may be located in a plane or concave surface, so as to produce or maintain a plane or convex surface on the blotting block. When the latter has a convex surface as produced or maintained by concave abrading means, it is evidently capable of being rocked upon the writing or drawing which is to be dried.

In whatever form it is given the abrading means may be permanently secured in the recessed or gripping member, or removably located therein. For example, in a circular gripping member, removable abrading means may have a lug or preferably a plurality of lugs, extending radially to engage in a depression or depressions correspondingly located in the inner peripheral surface of the wall about the recess, e. g., a diametrically opposed pair of L-shaped bayonet grooves or slots. Alternatively, a metal plate supporting or presenting abrading teeth or pins may have its margin spun into or otherwise permanently engaged in a metal construction of the recessed or gripping member, or incorporated permanently in a moulded member, or a plurality of pins may be permanently set in a moulded or cast member, or such member may be moulded or cast with integral abrading projections from the bottom of the recess therein.

The abrading means when mounted in a recess may be disposed above the bottom thereof, or upon a projection therein, so that the underlying space or the adjacent depression or depressions, as the case may be, serves to collect particles abraded from the absorbent surface of the blotter.

Conveniently, to prevent tearing or undue shredding of the peripheral surface of the absorbent block, and to maintain the cleanliness of said surface, it may be coated with an impregnating or covering substance of a nature which while being tough is friable at its edge by the abrading means. This substance may be, for example, gum, lacquer, paint, varnish or other natural or synthetic composition which presents, when dried, a smooth, preferably non-porous, surface that is not susceptible to softening by moisture or heat, or by contact with the fingers.

Various embodiments of blotting devices according to the invention will be described by way of example with reference to the accompanying drawings, wherein Fig. 1 is a perspective view of a blotting device in the form of a cylindrical block, Fig. 2 is a side elevation of the same, partly in section, Fig. 3 is a bottom plan view of the same, Fig. 4 is a side elevation, partly in section, of another cylindrical blotter removed from its gripping member and positioned for abrading of the absorbent surface, Fig. 5 is an inside plan view of the gripping member shown in Fig. 4, and Fig. 6 is a perspective view of a cuboid blotting device and its holder member.

In the embodiment shown in Figs. 1, 2 and 3 of the drawings, a cylindrical absorbent block 1 composed of a strip of blotting paper wound spirally, as indicated in Fig. 3, has one of its ends mounted in a holder 2, in the form of a ring or cap. This holder 2 is firmly engageable in a gripping member 3, which is of a size conveniently to be grasped in the hand, e. g., about 3" in diameter, as by pins or projections 4 equiangularly spaced about the holder 2 and engageable in L-shaped slots 5 similarly spaced about the interior surface of a ring member 6 which is secured within the skirt 7 of the gripping member 3. The ring 6 serves to secure in the interior of the gripping member 3 an abrading member 8 which preferably, as diagrammatically illustrated in Fig. 2, consists of a thin metal sheet with roughly punched, small apertures, the ragged edges of which serve as abrading teeth (as in a nutmeg grater).

The holder 2 may be made in any convenient, cheap and easily produced form since, as shown, it is completely covered when engaged in the gripping member 3 which may be of more ornamental, attractive or valuable material. The projections 4 on the holder 2 may be pressed outwards from the inner surface thereof prior to the attachment of the holder to the block of blotting paper 1. The blotting block 1 and its holder 2 are thus made as a cheap refill for a more expensive and/or perdurable gripping member. For example, the holder 2 may be of thin aluminium, brass or other common metal, while the gripping member 3 is of gold, silver or electroplate, or of a common metal embellished with an enamel covering, which may have an ornamental colouring or pattern or may bear advertising matter or the like. Such a metal gripping member is shown in Fig. 2. Evidently, however, the gripping member may be of other materials, e. g., semi-precious stone, such as jade or malachite, or moulded synthetic resinous or cellulosic composition. In such case the abrading member 8 may conveniently be secured in the bottom of a circular recess by a ring member such as 6 cemented in. There is no limit to the variety of substances which may be employed for the gripping member 3, subject, of course, to variations of form appropriate to their physical characteristics and to the fact that the member is to be conveniently grasped by the hand.

As shown in Fig. 2, the abrading member 8 is concave, and is intended to maintain a convex end surface 9 on the absorbent block 1, whereby the block is rendered capable of being rocked upon the writing or drawing which is to be dried.

In the modifications shown in Figs. 4 and 5, the cylindrical absorbent block 1 is mounted in a holder 2 provided with projecting helically disposed lugs 10, which are adapted to engage equiangularly spaced shoulders 11 presenting helical inner surfaces and rolled inwardly from the skirt 7 of the gripping member in a manner well known in the manufacture of closure caps for bottles and jars. In the manufacture of the gripping member as shown in Figs. 4 and 5, a flat abrading member 13 is secured in the interior thereof by part-cylindrical flanges 14 which are locked into the skirt 7 of the gripping member. The abrading member 13 is in the form of a diametrically disposed strip provided with a plurality of roughly punched small apertures 15 spirally located as shown in Fig. 5, so that while their ragged edges serve as teeth to abrade the entire end surface of the block 1, they are sufficiently spaced apart to eliminate the possibility of the abraded particles accumulating between them and reducing their effectiveness. Evidently, the flat abrading member 13 as shown in Fig. 4 will produce a plane end surface on the cylindrical block 1 when the latter is removed from the gripping member 3 and inverted into the position shown, wherein relative angular displacement of the block 1 and the member 3 will effect abrasion of the end surface of the block upon the teeth of the member 13.

The internal radius of the projections 11 in the gripping member is a little greater than the radius of the block 1 and allows a slight degree of side play as well as free relative rotation, so that the projections 11 serve as guide means to ensure that the end surface of the block is maintained normal to its axis during successive abrasions of said surface, while allowing a slight eccentricity of the block to ensure abrasion at the centre thereof. A similar guiding effect is afforded by the inner periphery of the ring 6 in the embodiment shown in Fig. 2.

Evidently, variations may be made. For example, a gripping member having an internal ring member 6, as shown in Fig. 2, may have helical or interrupted helical grooves engaging the holder 2 of the absorbent block by part-helical projections 10 as shown in Fig. 4. Further, the abrading member 8, as shown in Figs. 4 and 5, may be concave, while that in the embodiment shown in Fig. 2 may be plane.

As shown in Fig. 5, the abrading member 13 does not extend over the entire inner surface of the gripping member 3. Thereby the abrading of the absorbent surface of the block 1 towards its centre is rendered substantially equal to the abrading towards the outer periphery, so that there is no tendency for the periphery to be reduced to a greater extent than the centre. Furthermore, the substantially rectangular form of the abrading member 13 leaves on either side segmental openings 16 whereby particles abraded from the absorbent surface of the block 1 may be displaced into the space 17 (Fig. 4) between the abrading member 13 and the inner surface of the gripping member 3, and so prevented from gathering between the abrading member and the surface of the block during abrasion thereof and interfering with the abrading action.

In the embodiment shown in Fig. 6, the absorbent block 18 is of cuboid form, made up of sheets of blotting paper or the like, bonded together to a suitable thickness $a$, e. g., about 2 to 3 inches, the bonded sheets being formed in or cut to suitable dimensions, e. g., a length $b$ of about 5 to 8 inches and a breadth $c$ of about 2 to 2½ inches. One of the longer surfaces constituted by the edges of the several sheets serves as an absorbent surface and the opposite surface is embedded in a convenienly shaped holder 19. This holder is provided on its long sides with tongues 20 slidable into corresponding grooves 21 in the opposite side walls 22 of a gripping member 23. The inner transverse surface of the member 23, between its walls 22, carries an abrading member 24.

In use, the absorbent block 18 of the blotting device shown in Fig. 6 is secured in the gripping member by sliding the tongues 20 on its holder 19 into the grooves 21 in the walls of the gripping member, the mutual relationship being maintained, for example, by ball catches 25 engaging under the pressure of enclosed springs in part-spherical recesses 26 in the sides of the holder 19. The balls 25 may be inserted in the walls 22 of the gripping member 3 from the outer sides thereof, the apertures in which these balls and their springs are housed being closed by grub screws 27.

When the absorbent surface of the block 18 requires cleaning, the block with its holder member 19 can be slid out of the gripping member 23, inverted and reciprocated with its absorbent surface in contact with the abrading member 24, so that dust and ink-saturated particles or fibres are removed from the surface until a fresh absorbent surface is again presented.

The abrading member 24 may be curved either longitudinally or transversely so as to maintain a convex part-cylindrical absorbent surface on the block 18, so that the latter may be rocked upon writing to be dried.

Since in the abrading of a block such as 18 the abraded particles may escape freely out of the ends of the member 24, the latter may extend over the entire inner surface of the gripping member 23. Alternatively, the abrading member may extend over a strip transverse to the direction of reciprocation of the block, or alternatively over two or more strips, with adjacent or intervening transverse depressions adapted to collect abraded particles until the abrasion is finished, when said particles can be shaken out of the gripping member before the re-assembly of said member with the holder 19.

In each of the foregoing embodiments, when the holder and the gripping member are assembled in readiness for the blotting device to be used, the abrading member is completely enclosed and protected from the accumulation of dirt and dust, and any possibility of damage to the hands upon the teeth of the abrading member is prevented.

When the abrading device provided by the invention is intended for use as a base or stand for the blotter, it may evidently be circular or rectangular in correspondence with the shape of the blotter, having the abrading means in a recess adapted to receive the absorbent block and an opposite flat surface to stand upon a desk or table. Such a base or stand may, if required, be loaded, for example with lead, to serve as a paper-weight. A blotter for use with such a stand will evidently be of the general form illustrated in Fig. 1 or Fig. 6, and the absorbent block may be directly mounted in a holder such as 2 or 19.

Constructional modifications may be made without exceeding the scope of the invention. For example, a circular gripping member such as 3, Figs. 1 to 5, or a circular base or stand, may be moulded or cast with the abrading means integral therewith or permanently set therein during manufacture. In such case, the abrading means may be constituted by a plurality of pins, set into the bottom of the recess, or by a plurality of sharp integral projections from the bottom of the recess, preferably spirally disposed in the manner of the teeth 15 shown in Fig. 5. Abrading means in the form of pins may similarly be set in a gripping member such as 23, Fig. 6. Alternatively, the abrading means may be removably located in the gripping member, or base or stand. For example, a metal strip such as 13, Fig. 5, or 24, Fig. 6, or a metal disc such as 8, Fig. 2, or a metal strip or disc having rasp-like or file teeth, or a member in which a plurality of separate pins are set, may be engageable in the gripping member, or the base or stand, as by being sprung therein, or by having lugs adapted to be inserted in slots and locked by relative displacement of the gripping member and the abrading member.

I claim:

1. A blotting device comprising, in combination, a block of absorbent material, one of the surfaces of the block being the absorbent surface, a holder embracing a surface of the block opposite to said absorbent surface, and a gripping member removably engaging the holder, said gripping member having a recess adapted to receive the absorbent surface and abrading means located in the recess to serve under relative movement of the block and said member to clean the absorbent surface.

2. A blotting device comprising, in combination, a block constituted by at least one strip of blotting paper wound spirally into a cylinder, one of the circular ends of the cylinder being the absorbent surface, a holder embracing the other end of the cylinder, and a gripping member removably engaging the holder, said gripping member having a circular recess adapted to receive the absorbent surface and abrading means located in the recess to serve under relative turning of the block and said member to clean the absorbent surface.

3. A device for cleaning the absorbent surface of a blotter of the kind constituted by at least one strip of blotting paper wound spirally into a cylinder, one of the circular ends of the cylinder being plane and forming the absorbent surface thereof, said device comprising a member having a circular recess adapted to receive the absorbent surface and abrading means located in a plane transverse to the axis of the recess to serve under relative turning of the cylinder and said member to clean and maintain the plane absorbent surface.

4. A blotting device comprising, in combination, a block constituted by at least one strip of blotting paper wound spirally into a cylinder, one of the circular ends of the cylinder being convex and forming the absorbent surface thereof, a holder embracing the other end of the cylinder, a peripheral series of helically disposed lugs on the holder, a gripping member having a circular recess adapted to receive the absorbent surface, a plurality of spaced, internal helical shoulders on the periphery of the recess, said shoulders being engageable by said lugs, for removably securing the cylinder by the holder in the gripping member, and abrading means located in said recess in a concave surface coaxial with the recess to serve under relative turning of the cylinder and the gripping member to clean and maintain the convex absorbent surface.

5. A blotting device comprising, in combination, a block constituted by a compacted plurality of rectangular sheets of blotting paper, one of the surfaces constituted by the edges of the sheets forming the absorbent surface of the block, a rectangular holder embracing the opposite surface of the block, a tongue extending along each of the longer sides of the holder, a rectangular gripping member, two parallel walls extending along the longer sides of said member, a longitudinal groove in each of the opposed faces of said walls, said tongues being engageable in said grooves for removably securing the holder in the gripping member, and abrading means disposed in a transverse plane surface between said walls to serve under relative reciprocation of the block and the gripping member to clean and maintain the plane absorbent surface.

6. A blotting device according to claim 2, wherein the peripheral surface of the cylindrical absorbent block has a coating of an impervious, tough, friable substance.

7. A blotting device according to claim 4, wherein the peripheral surface of the cylindrical absorbent block has a coating of an impervious, tough, friable substance.

8. A blotting device according to claim 5, wherein the lateral walls of the block have a continuous coating of an impervious, tough, friable substance.

9. A device for cleaning the absorbent surface of a blotter of the kind constituted by a plurality of layers of absorbent material secured together as a block wherein the edges of the layers constitute the absorbent surface, said device comprising a member having a recess adapted to receive the absorbent surface and abrading means located in the recess to serve under relative movement of the block and said member to clean the absorbent surface, said abrading means being spaced from the bottom of the recess and extending over part thereof, and the surface adjacent said means serving as a receptacle for particles abraded from the absorbent surface.

10. A blotting device comprising, in combination a block of absorbent material, one of the surfaces of the block being the absorbent surface, a holder embracing a surface of the block opposite to said absorbent surface, and a gripping member removably engaging the holder, said gripping member having a recess adapted to receive the absorbent surface and abrading means located in the recess to serve under relative movement of the block and said member to clean the absorbent surface, said abrading means being spaced from the bottom of the recess and extending over part thereof, and the space adjacent said means serving as a receptable for particles abraded from the absorbent surface.

PERCY JOSEPH GILLESPIE.